United States Patent
Michel et al.

(10) Patent No.: US 8,534,684 B2
(45) Date of Patent: Sep. 17, 2013

(54) WHEEL SUSPENSION FOR THE REAR WHEELS OF MOTOR VEHICLES

(75) Inventors: Wilfried Michel, Riedenburg (DE);
Hugo Müller, Rohrenfels-Ballersdorf (DE); Karl-Heinz Meitinger, München (DE); Christoph Kossira, Ingolstadt (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/379,172

(22) PCT Filed: May 22, 2010

(86) PCT No.: PCT/EP2010/003155
§ 371 (c)(1),
(2), (4) Date: Dec. 19, 2011

(87) PCT Pub. No.: WO2010/145746
PCT Pub. Date: Dec. 23, 2010

(65) Prior Publication Data
US 2012/0098221 A1    Apr. 26, 2012

(30) Foreign Application Priority Data
Jun. 17, 2009  (DE) .......................... 10 2009 025 227

(51) Int. Cl.
*B62D 17/00*    (2006.01)

(52) U.S. Cl.
USPC .................................................. 280/86.751

(58) Field of Classification Search
USPC ................... 280/5.52, 5.521, 86.751, 86.752, 280/86.758, 93.503, 93.504, 124.116, 124.128, 280/124.134, 124.135, 124.15
See application file for complete search history.

(56) References Cited

U.S. PATENT DOCUMENTS

| | | | | |
|---|---|---|---|---|
| 5,009,447 A | * | 4/1991 | Gabel | 280/5.521 |
| 5,415,427 A | * | 5/1995 | Sommerer et al. | 280/124.142 |
| 5,513,874 A | * | 5/1996 | Mori | 280/93.51 |
| 6,116,627 A | * | 9/2000 | Kawabe et al. | 280/124.15 |
| 2002/0036385 A1 | | 3/2002 | Maeckle et al. | |
| 2008/0100021 A1 | | 5/2008 | Yamada | |

FOREIGN PATENT DOCUMENTS

| | | | |
|---|---|---|---|
| DE | 37 43 203 A1 | | 7/1989 |
| DE | 10 2004 034 118 A1 | | 9/2005 |
| DE | 10 2008 011367 A1 | | 4/2009 |
| DE | 102008011367 A1 | * | 4/2009 |
| FR | 28 84 795 A1 | | 10/2006 |
| WO | WO 98/16418 A1 | | 4/1998 |
| WO | WO 99/54 186 A1 | | 10/1999 |
| WO | WO 2005/000606 A1 | | 1/2005 |
| WO | WO 2005000606 A1 | * | 1/2005 |

* cited by examiner

*Primary Examiner* — Paul N Dickson
*Assistant Examiner* — Robert A Coker
(74) *Attorney, Agent, or Firm* — Henry M. Feiereisen LLC

(57) ABSTRACT

The invention relates to a wheel suspension for motor vehicles, comprising a wheel carrier (14), which has a wheel-side carrier part (16) that rotatably supports a vehicle wheel (12) and an axle-side guide part (18), between which a control element is connected, wherein the wheel-side carrier part (16) can be pivoted about a pivot angle relative to the axle-side guide part (18) to set a toe angle and/or camber angle when the control element is actuated. According to the invention, the wheel carrier (14), in particular the guide part (18) thereof, is guided directly or indirectly on a linear guide (26) affixed to the body in form of a slotted guide, allowing movement in the vertical direction.

15 Claims, 2 Drawing Sheets

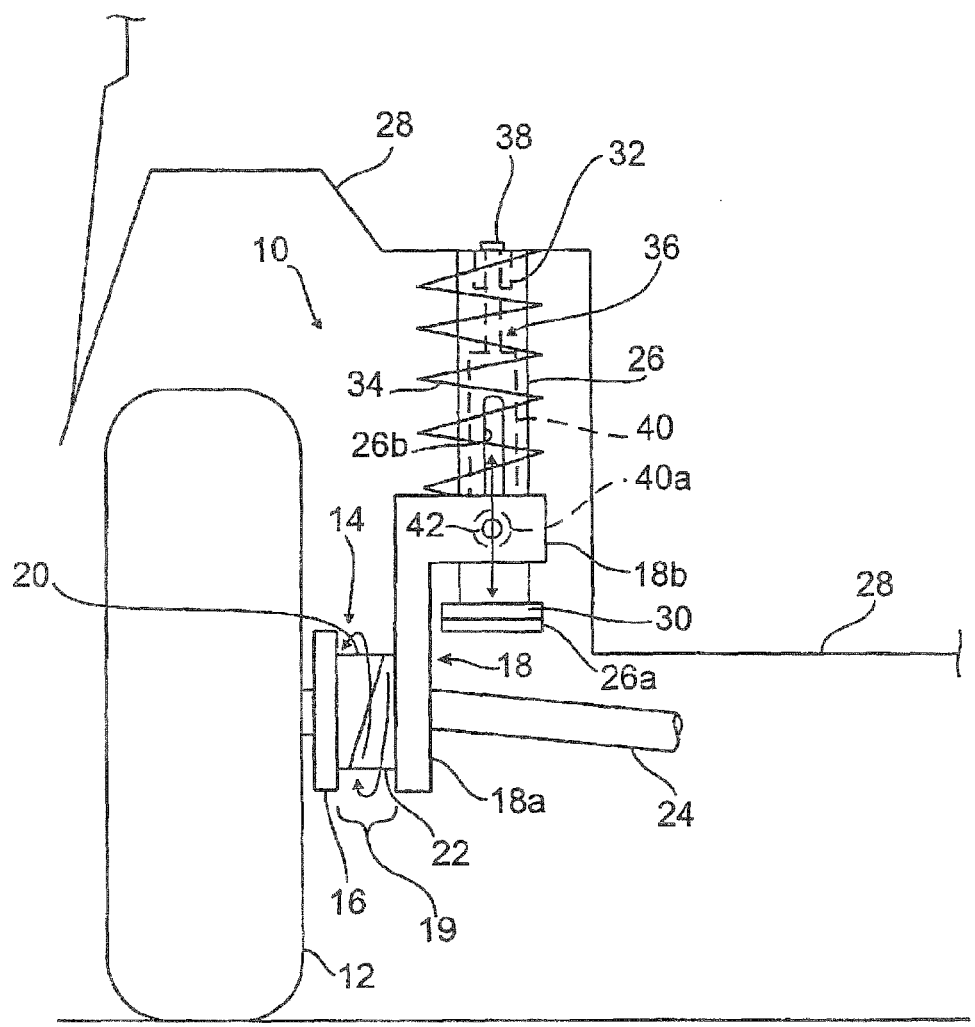

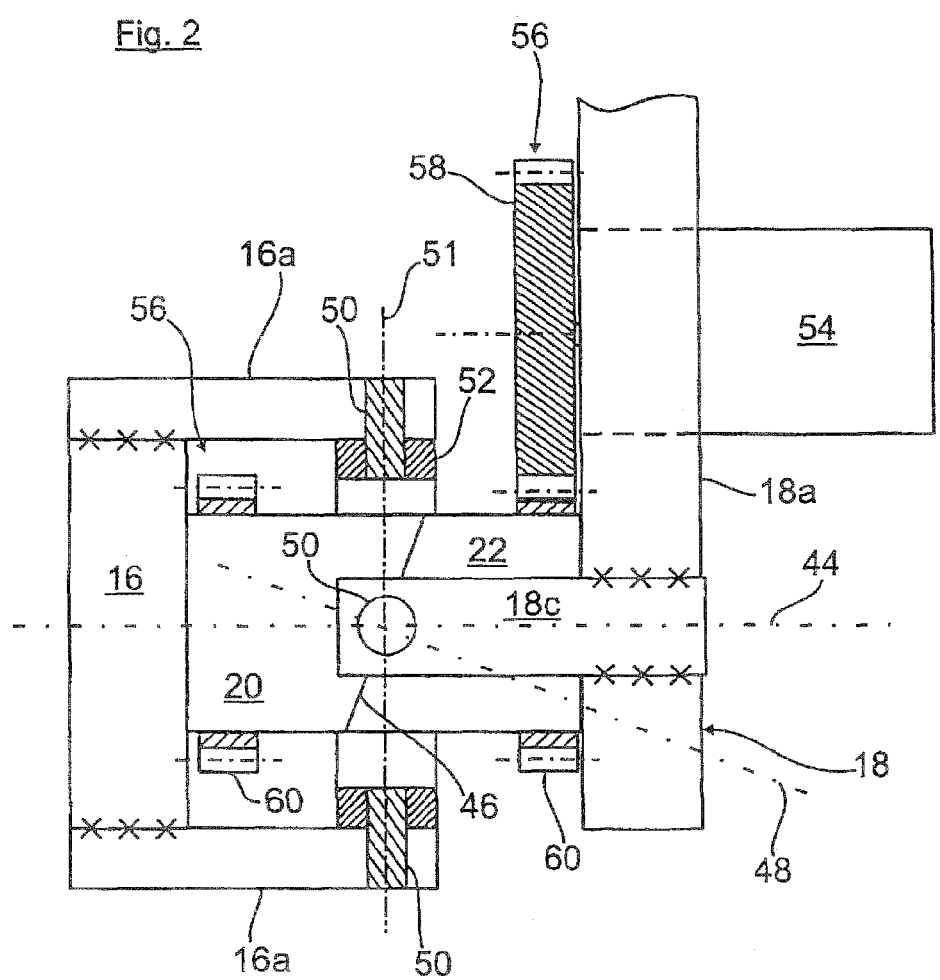

WHEEL SUSPENSION FOR THE REAR WHEELS OF MOTOR VEHICLES

CROSS-REFERENCES TO RELATED APPLICATIONS

This application is the U.S. National Stage of International Application No. PCT/EP2010/003155, filed May 22, 2010, which designated the United States and has been published as International Publication No. WO 2010/145746 and which claims the priority of German Patent Application, Serial No. 10 2009 025 227.4, filed Jun. 17, 2009, pursuant to 35 U.S.C. 119(a)-(d).

BACKGROUND OF THE INVENTION

The invention relates to a wheel suspension for the rear wheels of motor vehicles.

The driving dynamics of modern motor vehicles is typically influenced also by the wheel suspensions of the rear wheels, whose control arms operating as wheel guiding elements produce specific driving characteristics, for example a specific understeering tendency, etc., due to their spatial arrangement and due to the elasticity of the control arm bearings Various technical solutions exist for a technical implementation of rear axle steering of a (road) vehicle. Typically, the tie rod is moved or its length is changed. Other embodiments with a divided wheel carrier are known, as described, for example, in US 20020036385, WO 199816418 or in FR 2884795. A separated wheel carrier of this type is divided into a carrier part, a guide part and an interconnected actuator having two rotary parts which can rotate with respect to one another and with respect to the guide part and carrier part. The carrier part can be adjusted relative to the guide part for camber and/or toe adjustment with electrical actuator motors. However, the construction and implementation of wheel suspensions with or without the aforementioned adjusting device is relatively complicated and expensive.

Conventional rear axle steering arrangements always require conventionally constructed wheel guiding, starting with an axle principle of conventional construction. If steering is desired, then the steering function is added to the axle by suitable measures. For example, the tie rod and/or a control arm may be moved or their length be changed. In addition, the aforementioned divided wheel carriers are known which can be pivoted accordingly. Disadvantageously, however, the overall axle structure is already very complex, even without the steering option. The technical complexity, expenditures, and costs increase further when steerability is desired.

It is an object of the invention to propose a wheel suspension of the generic type which allows almost arbitrarily steerable wheel positions and advantageous driving characteristics of the motor vehicle by eliminating complex control arms and control arm bearings and which has a structurally simple design.

SUMMARY OF THE INVENTION

According to an aspect of the invention a wheel suspension for motor vehicles includes a wheel carrier with a carrier part arranged on a side of a vehicle wheel and rotatably supporting the vehicle wheel, and an guide part arranged on a side of a vehicle axle, and an actuator interconnected between the carrier part and the guide part, wherein the actuator is configured to pivot the wheel-side carrier part for adjusting at least one of a camber and toe angle with respect to the axle-side guide part by a pivot angle. The wheel carrier, in particular its guide part, is indirectly or directly positively guided on a linear guide affixed to the body only in the vertical direction, similar to a sliding guide. The linear guide unit according to the invention may simultaneously include a spring and a damper and prevent the wheel from turning about the vertical axis when longitudinal forces are introduced, or respective force components which would cause a rotation. A control arm or tie rod can then be eliminated, producing an advantageous assembly.

According to the invention, the elastic-kinematic movement of the vehicle wheel is caused by a combination of the pivoting motion of the wheel-side carrier part of the wheel carrier initiated by the actuator and the superimposed linear motion along the linear guide affixed to the body. A desired self-steering characteristic of the vehicle wheel can thus be attained by eliminating complex transverse/longitudinal control arm structures.

The wheel carrier may additionally include a device for camber/toe adjustment of the rear wheel. For this purpose, the wheel carrier may be divided into a carrier part receiving the wheel, a guide part connected to the wheel guiding elements, and two interconnected actuator cylinders able to rotate about a common rotation axis with respect to one another and also with respect to the carrier part and the guide part, wherein the actuator cylinders cooperate with facing slanted surfaces which are inclined by a defined angle with respect to the rotation axis. Each of the actuator cylinders can be adjusted with a corresponding electric motor and an actuator drive in both rotation directions. In addition, the bearing spring may be supported between the body and the guide part of the wheel carrier. The proposed combination enables a wheel suspension without the use of complex control arms which are difficult to arrange in space and control arm bearings requiring complex adjustments, while nevertheless ensuring desired driving characteristics due to the divided wheel carrier which allows a specific camber and toe adjustment of the wheel.

Intentional steering movements (camber and/or toe) can therefore be predetermined for the wheel or forced on the wheel by a controller. All relevant control parameters are used, such as for example spring excursion, steering angle on the front axle, instantaneous speed, instantaneous acceleration, etc. A divided wheel carrier makes possible the three-dimensional tilt of the wheel. This design produces significant weight, cost and assembly advantages. The principle is suitable for both towed axles and driven axles. The technical realization is illustrated in FIGS. 1 and 2. The illustrated example shows a driven axle, which includes a cardan shaft.

In an advantageous embodiment of the invention, the linear guide may at least have a downwardly projecting column which is affixed to the body, wherein at least a bushing-shaped section of the guide part is guided on the column for movement in the vertical direction. For example, two adjacent axially parallel columns may also be provided, which ensure vertical guiding with stable transverse stiffness, bending stiffness and torsion stiffness.

In a particularly simple structural design, only a single column affixed to the body may be provided, on which a bushing-shaped section of the guide part is movable in the vertical direction, while being formfittingly guided in the circumferential direction. The column and the bushing-shaped section may be constructed in form of a polygon with corresponding sliding surfaces in order to ensure reliable guiding in the presence of circumferential forces without jamming.

In addition, the bearing spring may be arranged around the linear guide and/or the column, thereby achieving a distortion-free support of the bearing spring, in particular of a helical compression spring.

In addition, when the rear axle of the motor vehicle is driven, the approximately horizontally projecting bushing-shaped section of the guide part may be arranged far enough above a vertical section carrying the actuator cylinder, so that a cardan shaft driving the wheel of the wheel suspension may be guided over the designed spring depression excursion of the wheel carrier through the actuator cylinder below the linear guide, while leaving adequate unobstructed space.

In another advantageous embodiment of the invention, the telescopic shock absorber may also be installed between the body and the guide part and operate with a 1:1 transmission ratio in the wheel suspension.

The shock absorber may here be arranged parallel next to the bearing spring. Preferably, however, it is proposed for conserving installation space to advantageously directly integrate the shock absorber into the linear guide and/or in the tubular column and drivingly couple the shock absorber with the bushing-shaped section of the guide part.

Lastly, the lower end of the column of the linear guide may include a ring shoulder which by interconnecting a rubber-elastic buffer operates as lower stop for the bushing-shaped section of the guide part and accordingly as spring deflection stop for the wheel carrier.

BRIEF DESCRIPTION OF THE DRAWING

An exemplary embodiment of the invention will be described below in more detail. The schematic drawing shows in:

FIG. 1 a rear view of a rear wheel suspension for motor vehicles with a multi-component wheel carrier, which is preferably supported on a downwardly projecting column forming a linear guide; and FIG. 2 in a simplified schematic diagram, the multi-component wheel carrier with actuator cylinders which are adjustable via actuator drives and electric motors for variable adjustment of a camber and toe.

DETAILED DESCRIPTION OF PREFERRED EMBODIMENTS

FIG. 1 shows a wheel suspension, designated as 10, for motor vehicles, with the rear wheel 12 rotatably supported on a wheel carrier 14.

The multi-component wheel carrier 14 is composed of a carrier part 16 receiving the wheel 12, a suspension-side guide part 18, and an interconnected actuator 19 which has two rotary parts in form of actuator cylinders 20, 22 which can rotate relative to one another.

The guide part 18 has an approximately vertically extending section 18a, through which a cardan shaft 24 (only partially illustrated) extends which drives the wheel 12.

A bushing-shaped section 18b, which is movable on a tubular column 26 as a linear guide, projects approximately horizontally from the vertical section 18a of the guide part 18 and in the longitudinal center plane of the vehicle.

The column 26 is attached on the load-bearing body 28 of the motor vehicle and has at its bottom end a ring shoulder 26a with a larger diameter, with the ring shoulder 26a with an interconnected damping ring 30 operating as a lower spring excursion stop for the guide part 18 and the wheel carrier 14, respectively.

The approximately horizontally projecting bushing-shaped section 18b of the guide part 18 is, as illustrated, arranged far enough above the vertical section 18a carrying an actuator cylinder 22 so that the cardan shaft 24 driving the wheel 12 of the wheel suspension can be guided through the section 18a and the actuator cylinders 22, 20 with always sufficient clearance below the linear guide or the column 26.

The column 26 is, as viewed in cross-section, polygonal, preferably constructed as external hex, which in cooperation with the internal hex sliding guide in the bushing-shaped section 18b provides a formfitting connection in the circumferential direction.

Alternative to the embodiment of the column 26 as an external hex, the column 26 may also have a square profile for improved torque support. Alternatively, the column may also have a cylindrical profile, with a rotation lock formed by the longitudinal slot 26b of the column 26 and the screw extending through the longitudinal slot 26b.

A helical compression spring forming a bearing spring 34 is supported between the body 28 and the bushing-shaped section 18b of the guide part 18. The bearing spring 34 extends, as illustrated, around the column 26 and thus absorbs the static and dynamic wheel loads without bending moments and distortions.

A telescopic shock absorber 36 is arranged inside the column 26 forming a linear guide for the wheel carrier 14, wherein the piston rod 38 of the shock absorber 36 is attached on the body 28 by an (unillustrated) screw connection, whereas the cylinder tube 40 is fixedly connected with the bushing-shaped section 18b of the guide part 18.

For this purpose, a longitudinal slot 26b is provided in the column 26, with a bearing eye 40a of the cylinder tube 40 of the shock absorber 36 being fixedly connected with the bushing-shaped section 18b of the guide part 18 through the longitudinal slot 26b by a screw 42 and a spacer sleeve (not visible) sliding in the longitudinal slot 26b.

A stop a buffer 32 which cooperates with the cylinder tube 40 and operates as spring deflection stop is inserted around the piston rod 38 of the shock absorber 36.

FIG. 2 shows the structure and the function of the multi-component wheel carrier 14, with which the camber and/or the toe of the wheel 12 can be variably adjusted and superimposed on the linear guide 26 forming an inherently rigid wheel guide.

One actuator cylinder 20 is hereby supported on the carrier part 16 for rotation about the illustrated wheel rotation axis 44, whereas the other, axially adjacent actuator cylinder 22 is supported for rotation on the only partially illustrated guide part 18 or on its vertical section 18a, respectively.

Furthermore, the two actuator cylinders 20, 22 have abutting slanted surfaces, generally designated with 46, and are connected with each other via a rotation axis 48 extending parallel thereto. A rotation of the actuator cylinders 20, 22 in the same direction and/or relative to each other in one or the other rotation direction cause tilting or tumbling of the wheel carrier-side actuator cylinder 20 with the carrier part 16 and/or with the wheel 12, thereby enabling an intentional change in the camber and/or the toe of the wheel 12. For supporting the torque of the carrier part 16 relative to the guide part 18, two axially parallel projecting extensions 16a, 18c, which are mutually diametrically offset, are provided, on which a support ring 52 is gimbal-mounted via bearing bolts 50. The centerline 51 of the respective bearing bolts 50 is hereby located in a rotation plane which includes the point of intersection of the wheel rotation axis 44 with the rotation axis 48 extending perpendicular through the slanted surfaces 46.

The rotation of each of the actuator cylinders 20, 22 is controlled by an electric motor 54 attached on the carrier part 16 and the guide part 18 and operating on a spur gear 60 on the actuator cylinders 20, 22 by way of an actuator drive 56 having a drive pinion 58. Only the electric motor 54 with the drive pinion 58 is visible in FIG. 2 on the guide part 18; the arrangement of the electric motor 54 with the drive pinion 58 on the carrier part 16 is substantially identical.

The invention is not limited to the illustrated exemplary embodiment. If desired, two columns which are preferably sequentially arranged in the longitudinal direction of the vehicle can also be used as linear guide instead of a single column 26, representing an enhanced support basis in the circumferential direction and/or in linear guiding of the wheel 12. The bearing spring 34 and the telescopic shock absorber 36 may also be arranged outside the linear guide 26.

The invention claimed is:

1. A wheel suspension for a motor vehicle, comprising:
a wheel carrier comprising a carrier part arranged on a side of a vehicle wheel and supporting the vehicle wheel for rotation about a wheel rotation axis, and a guide part arranged on a side of a vehicle axle,
an actuator interconnected between the carrier part and the guide part,
wherein the actuator is configured to pivot the wheel-side carrier part for adjusting at least one of a camber and toe angle with respect to the axle-side guide part by a pivot angle,
wherein the wheel carrier is indirectly or directly guided for movement in a vertical direction on a linear guide which is implemented as a sliding guide and affixed to a vehicle body.

2. The wheel suspension of claim 1, wherein the guide part of the wheel carrier is indirectly or directly guided on the linear guide.

3. The wheel suspension of claim 1, further comprising a bearing spring and a telescopic shock absorber arranged in a load path between the vehicle body and the wheel carrier.

4. The wheel suspension of claim 3, wherein the bearing spring is supported between the vehicle body and the guide part.

5. The wheel suspension of claim 3, wherein the telescopic shock absorber is interconnected between the vehicle body and the guide part.

6. The wheel suspension of claim 1, wherein the actuator comprises a wheel-side rotary part and an axle-side rotary part, each of the rotary parts defining a corresponding rotation axis, wherein the rotary parts are rotatable with respect to each other about their corresponding rotation axes, and wherein the wheel-side rotary part is deflected with respect to the axle-side rotary part upon rotation.

7. The wheel suspension of claim 6, wherein the wheel-side rotary part and the axle-side rotary part comprise cooperating facing slanted surfaces which are inclined by a defined angle with respect to the wheel rotation axis.

8. The wheel suspension of claim 7, wherein the wheel-side rotary part and the axle-side rotary part are each adjustable in opposite rotation directions with an electric motor and an actuator drive.

9. The wheel suspension of claim 1, wherein the linear guide comprises at least one downwardly projecting column which is affixed to the vehicle body, and wherein the guide part comprises at least one bushing-shaped section guided on the at least one column for movement in the vertical direction.

10. The wheel suspension of claim 9, wherein the bushing-shaped section is formfittingly guided in a circumferential direction on the at least one column.

11. The wheel suspension of claim 9, further comprising at least a bearing spring arranged in a load path between the vehicle body and the wheel carrier, wherein the bearing spring is arranged around the linear guide or the at least one column.

12. The wheel suspension of claim 9, wherein the approximately horizontally projecting, bushing-shaped section of the guide part is arranged far enough above a vertical section supporting the axle-side rotary part so as to allow a cardan shaft driving the vehicle wheel to be guided through at least the axle-side rotary part disposed below the linear guide.

13. The wheel suspension of claim 9, wherein the telescopic shock absorber is directly integrated in the linear guide or in the at least one downwardly projecting column.

14. The wheel suspension of claim 9, wherein the telescopic shock absorber is drivingly coupled with the at least one bushing-shaped section of the guide part.

15. The wheel suspension of claim 9, wherein the at least one downwardly projecting column comprises a ring shoulder disposed at a lower end of the column, with the ring shoulder in cooperation with an interconnected rubber-elastic buffer operating as a lower stop for the at least one bushing-shaped section of the guide part.

* * * * *